United States Patent [19]
Dehmlow et al.

[11] Patent Number: 5,920,366
[45] Date of Patent: Jul. 6, 1999

[54] DYNAMIC MULTI-CONTACT DISPLAY HEATER SYSTEM

[75] Inventors: Brian P. Dehmlow, Cedar Rapids; Scott A. Bottorf, Ankeny; Gary D. Bishop, Marion; Martin J. Steffensmeier, Cedar Rapids; James D. Sampica, Cedar Rapids; Mark C. Skarohlid, Cedar Rapids; William S. Ebeltoft, Parkersburg, all of Iowa

[73] Assignee: Rockwell International Corporation, Costa Mesa, Calif.

[21] Appl. No.: 08/719,103

[22] Filed: Sep. 24, 1996

[51] Int. Cl.⁶ .......................... G02F 1/1333; H05B 3/02; H05B 1/02
[52] U.S. Cl. .......................... 349/161; 349/72; 219/486; 219/509; 219/539
[58] Field of Search .................... 349/161, 72; 219/486, 219/508, 509, 539, 507, 482, 483

[56] References Cited

U.S. PATENT DOCUMENTS

| | | |
|---|---|---|
| 4,093,355 | 6/1978 | Kaplit et al. ............................ 349/161 |
| 4,387,963 | 6/1983 | Brennan ..................................... 349/72 |
| 4,907,859 | 3/1990 | Takada et al. ........................... 349/161 |
| 5,088,806 | 2/1992 | McCartney et al. ..................... 349/161 |
| 5,559,614 | 9/1996 | Urbish et al. .............................. 349/72 |
| 5,566,879 | 10/1996 | Longtin .................................. 219/483 |
| 5,694,191 | 12/1997 | Strathman et al. ..................... 349/161 |
| 5,744,819 | 4/1998 | Yamamoto et al. ....................... 349/72 |
| 5,818,010 | 10/1998 | Mccann .................................. 219/210 |

Primary Examiner—Tiep H. Nguyen
Attorney, Agent, or Firm—Kyle Eppele; James P. O'Shaughnessy

[57] ABSTRACT

A multi-contact LCD heater system which include several contacts disposed around the periphery of a resistive film deposited on a substrate in which each contact is dynamically controlled in response to input from various temperature sensors. The control allows for each contact to be connected to a high potential or a low potential source or remain isolated. Spatial, temporal and amplitude modulation of the heat applied to the LCD is achieved.

5 Claims, 4 Drawing Sheets

DYNAMIC MULTI-CONTACT DISPLAY HEATER SYSTEM

CROSS-REFERENCE TO RELATED APPLICATIONS

This application relates to the following applications: LIQUID CRYSTAL DISPLAY WITH UNIFORM HEAT PRODUCING APPARATUS, by Strathman et al. having attorney's docket number 92CR213, Ser. No. 08/690,082, U.S. Pat. No. 5,694,181 which was filed on Jun. 13, 1994 and assigned to the same assignee, Rockwell International Corporation, and which application is incorporated herein by these references.

FIELD OF THE INVENTION

The present invention generally relates to liquid crystal displays (LCDs) and more particularly to heater systems for LCDs, and even more particularly relates to a dynamic multi-contact LCD heater system which uses spatial, temporal and amplitude modulation to regulate the temperature of an LCD.

BACKGROUND

In recent years, avionics engineers have endeavored to enhance the optical performance of LCDs. Such enhancements have been directed toward improvements in response times, more precision in gray scales, reduction of flicker and image retention as well as mechanical stress reduction. One particular method of addressing some of these issues has been to attempt to control the temperature across the display surface of an LCD. One approach has been to deposit transparent heating elements either uniformly accross, or in strategic places of the display and then providing a current through the element to generate resistive heating.

While this approach does have several beneficial aspects, it has several shortcomings. First of all, it may involve discontinuities of temperature on the face of the display. Secondly, it has a limited ability to dynamically affect temperature changes.

Consequently, there exists a need for an improved LCD heater system which provides for enhanced uniformity of temperature across the display surface.

SUMMARY OF THE INVENTION

It is an object of the present invention to provide enhanced uniformity of temperature across a display surface.

It is a feature of the present invention to include a planar resistive heater element, with several contacts disposed around the display periphery.

It is an advantage of the present invention to provide enhanced uniformity of temperature across the display while reducing any discontinuities across the LCD surface.

It is another feature of the present invention to include a dynamic control of the contacts with spatial, temporal and amplitude modulation.

It is another advantage of the present invention to provide enhanced ability to adapt heating applications to respond to particular temperature variations.

The present invention is a dynamically controlled multi-contact planar resistive heating system for LCDs which are designed to satisfy the aforementioned needs, provide the previously stated objects, include the above listed features, and achieve the already articulated advantages. In the present invention, the discontinuities of the prior art are reduced and the flexibility to address varying temperature profiles is increased.

Accordingly, the present invention is a heater system including a planar resistive heating element across the LCD surface with several dynamically controlled electrical contacts around the periphery of the LCD. The electrical contacts provide for spatial, temporal and amplitude modulation techniques to affect the LCD temperature.

BRIEF DESCRIPTION OF THE DRAWINGS

The invention may be more fully understood by reading the following description of a preferred embodiment of the invention, in conjunction with the appended drawings wherein.

DETAILED DESCRIPTION

Figure 1:
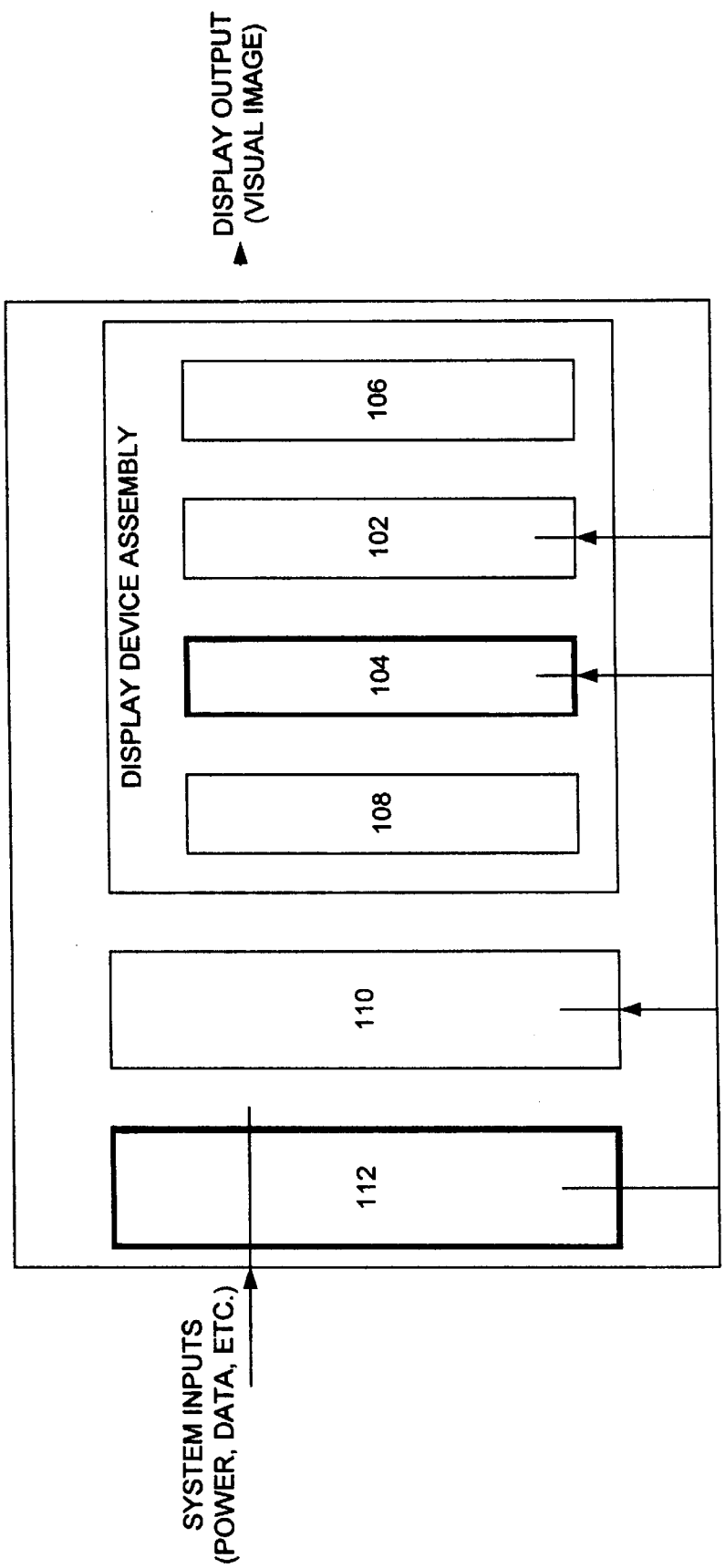
FIG. 1 is block diagram of the heater system of the present invention shown in its intended environment.

Now referring to the drawings, where like numerals refer to like matter throughout, and more particularly to FIG. 1, there is shown a block diagram of an LCD, generally designated 100, having therein an LCD device 102, of a type well known in the art, a heater device 104, of the present invention, a first set of optical components, 106 and a second set of optical components 108, which are both of a type well known in the art, backlighting assembly 110 and electronics assembly 112 which are also well known in the art. In operation, the electronics assembly 112 provides power and control of the backlight 110, the LCD device 102 and the heater device 104.

Figure 2:
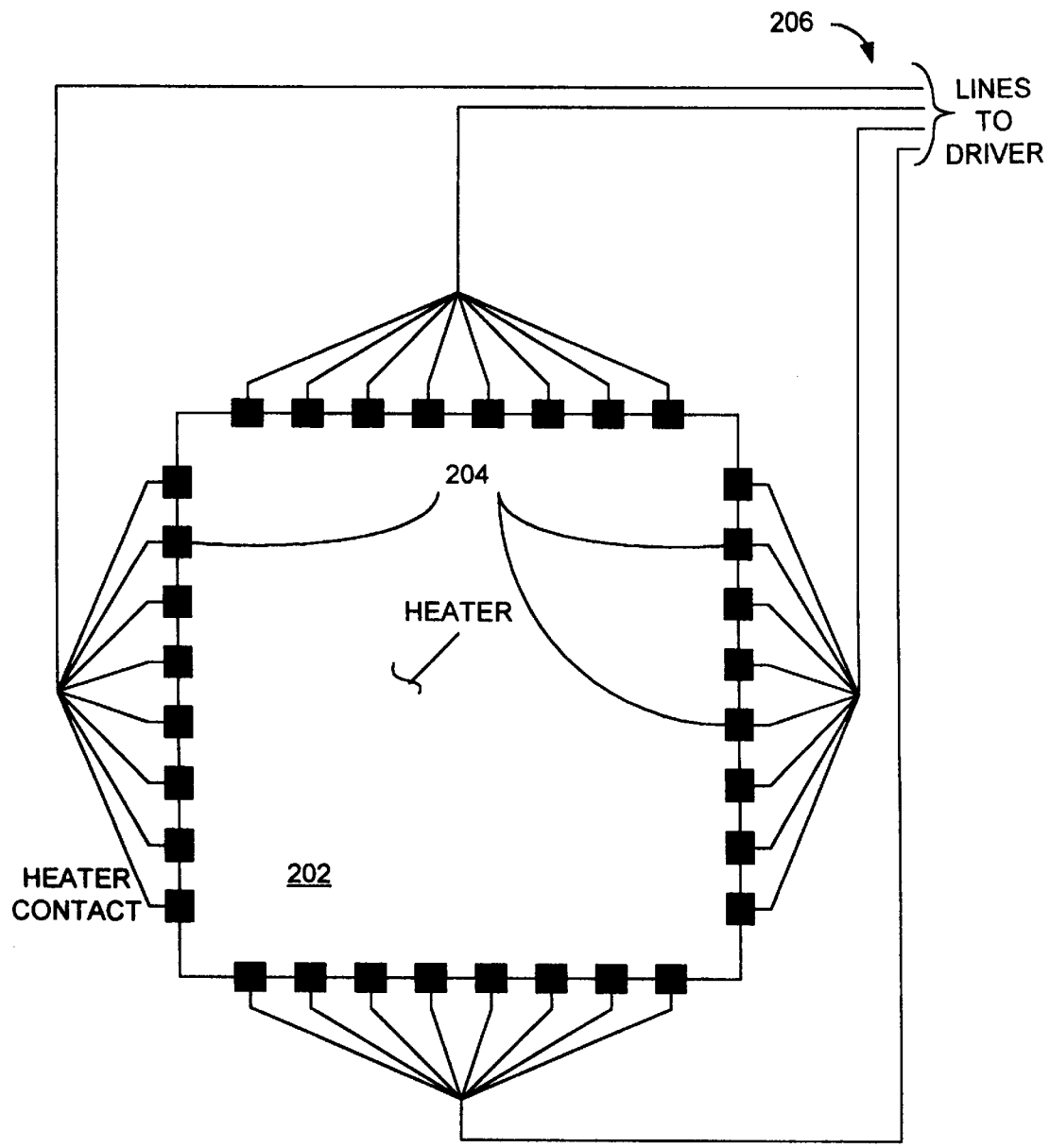
FIG. 2 is a plan view of a portion of the system of the present invention which shows a plurality of electrical contacts disposed around the periphery of a planar resistive element.

Now referring to FIG. 2, there is shown a plan view of a portion of the heating system of the present invention generally designated 200, which includes a central planar resistive element 202, which is preferably a transparent resistive film such as indium-tin-oxide (ITO) deposited on a glass substrate. Other materials which have similar optical, thermal, electrical, and mechanical properties could be substituted. Disposed around the periphery of element 202 is an array of electrical contacts 204 which are coupled to drivers (not shown) by lines 206. Lines 206 are preferably wires or other conductors such as flexible printed circuits which can be connected to the element 202 via conventional attachment methods such as conductive adhesives, anisotropic conductive films, and mechanical clips. Each of the electrical contacts is coupled to a power supply (not shown) by its individual line.

Figure 3:
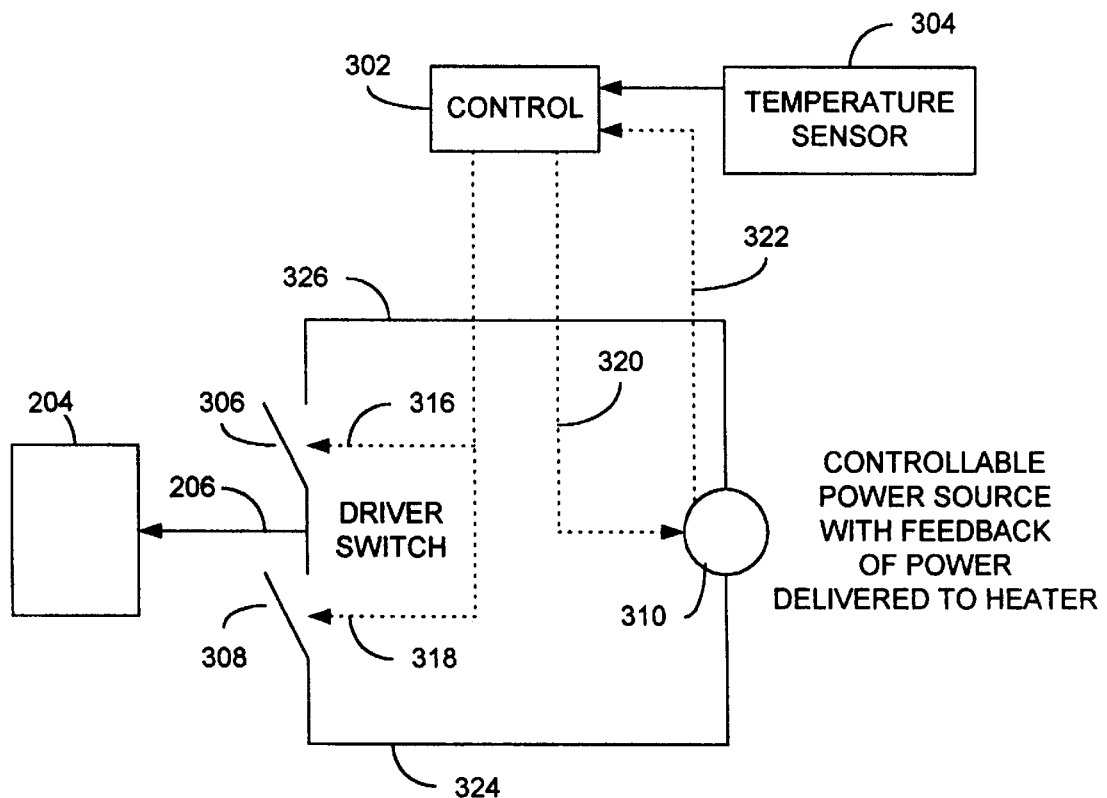
FIG. 3 is a schematic diagram of a representative drive loop for a single electrical contact in combination with shared control electronics and sensors.

Now referring to FIG. 3, there is shown, a schematic diagram of a portion of the present invention, generally designated 300, which is representative of a drive loop for an individual electrical contact 204 which is coupled to switches 306 and 308 by line 206. Switches 306 and 308 may be mechanical switches or preferably solid state devices such as FETs or SCRs. By closing switch 306 electrical contact 204 is coupled with the high potential terminal of power supply 310 via supply line 326. Power supply 310 is preferably a variable high potential source, of the type well known in the art. If switch 308 is closed instead then contact 204 is coupled to the low potential terminal of power supply 310 via return line 324. If neither switch 306 or switch 308 is closed then contact 204 is left "floating" with respect to the various potentials. Switches 306 and 308 and power supply 310 are coupled to and under the control of control electronics 302 by control lines 316, 318 and 320 respectively. Feedback of the power being delivered to the contact 204 is provided to control electronics by feedback line 322. Also shown coupled to control electronics are multiple temperature sensors 304 indicating the temperature distribution of the display.

Figure 4:
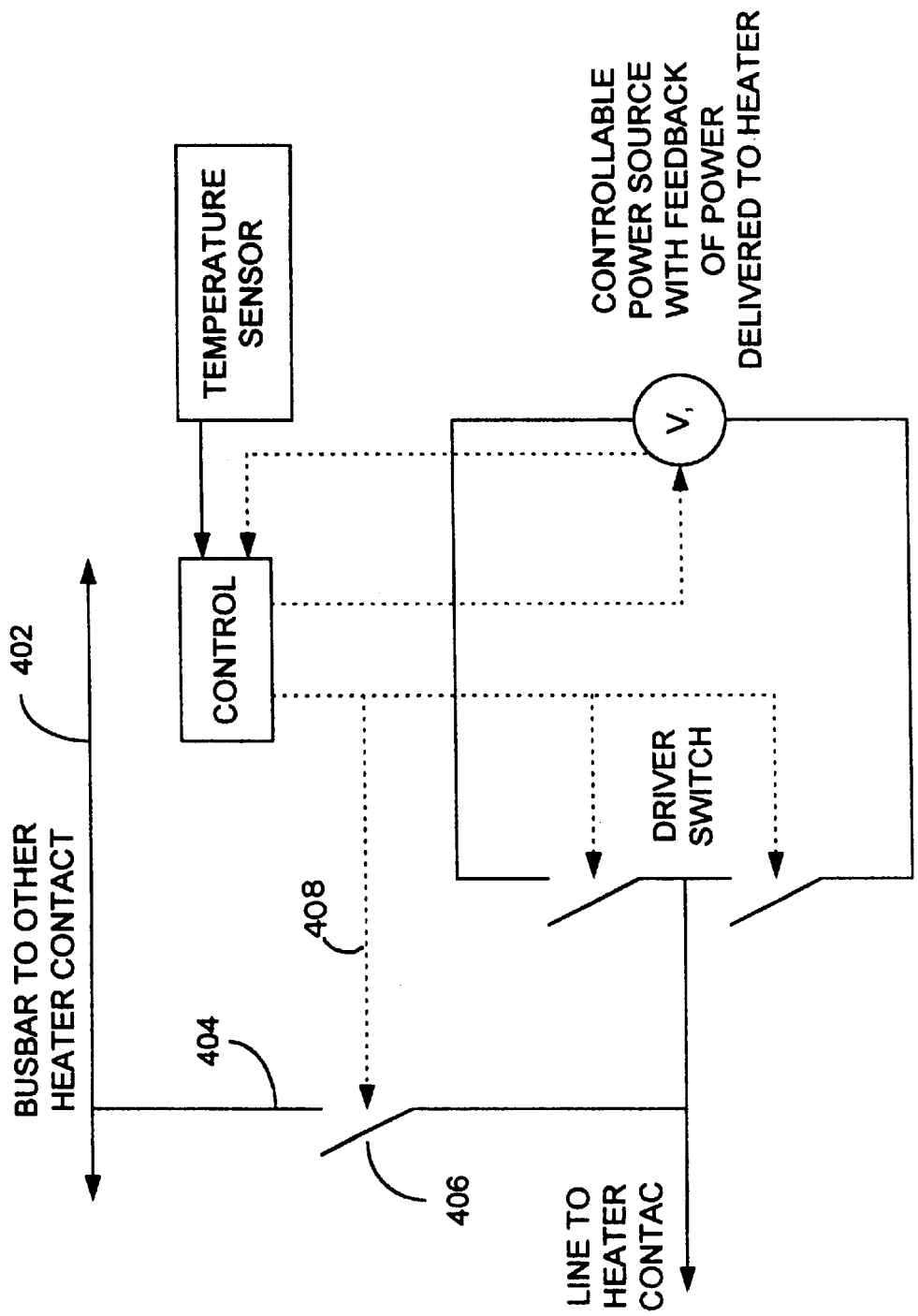
FIG. 4 is a schematic diagram of the representative loop of FIG. 3 with an additional switch and interconnecting bus bar included.

Now referring to FIG. 4, there is shown a schematic diagram of a representative portion of one embodiment of the present invention of FIG. 3 which includes a busbar 402 for optionally interconnecting several of the electrical contacts 204, via interconnect line 404 and interconnect switch 406, which is controlled by control electronics 302 via control line 408.

In application of the invention, each of the individaul electrical contacts 204 will be selectively assigned to one of three groups. The first group of contacts 204 will be connected to the high potental terminal of power supply 310. Simultaneously, the second group of contacts 204 will be connected to the low potential terminal of power supply 310. Simultaneous with the first and second groups, all remaining contacts 204 will be left floating by opening switches 306 and 308. Spatial distribution of contacts 204 within each of the three groups can be arbitrarily defined. Electrical power from power supply 310 will source from contacts in the first group and sink to contacts in the second group. Contacts in the third group will be bypassed. By this method, resistive heating can be provided at arbitrarily defined regions on the display face. Assignment of contacts 204 to each of the three groups listed above can be changed dynamically to accomplish the goals of the invention.

It is thought that the heater system of the present invention, will be understood from the foregoing description and it will be understood from the foregoing description and it will be apparent that various changes may be made in the form, construction, steps and the arrangement of the parts and steps, without departing from the spirit and scope of the invention or sacrificing all of their material advantages, the form herein being merely preferred or exemplary embodiments thereof.

We claim:

1. A heater for a liquid crystal display comprising:
a planar transparent resistive heating element, having a central region and a periphery
 a plurality of electrical contacts disposed on the element at the periphery;
 a plurality of power lines, each of said plurality of power lines being coupled to at least one of said plurality of electrical contacts;
 each of said power lines coupled to a high potential terminal of a power supply via a first switch and a low potential terminal of the power supply via a second switch;
 a plurality of temperature sensors for sensing a temperature of the display; and,
 means for dynamically controlling said switches in response to data received from said plurality of temperature sensors and for dynamically controlling a power output of the high potential power supply.

2. A heater for a display comprising:
a heating element having a central region and a periphery, disposed on a planar surface;
a plurality of contacts disposed on the element at the periphery;
a plurality of power lines, each of said plurality of power lines being coupled to at least one of said plurality of contacts;
each of said power lines coupled to a high potential terminal of a power supply via a first switch and a low potential terminal of the power supply via a second switch;
a plurality of temperature sensors for sensing a temperature of the display; and,
means for controlling said switches in response to data received from said plurality of sensors and for controlling a power output of the high potential power supply.

3. A heater of claim 2 further comprising a bus bar selectively interconnecting said plurality of contacts with said first switch and said second switch.

4. A heater of claim 3 wherein said heating element is a transparent planar resistive element.

5. A heater of claim 4 wherein each of said plurality of contacts is selectively connected with said bus bar by a third switch.

* * * * *